Figure 14:
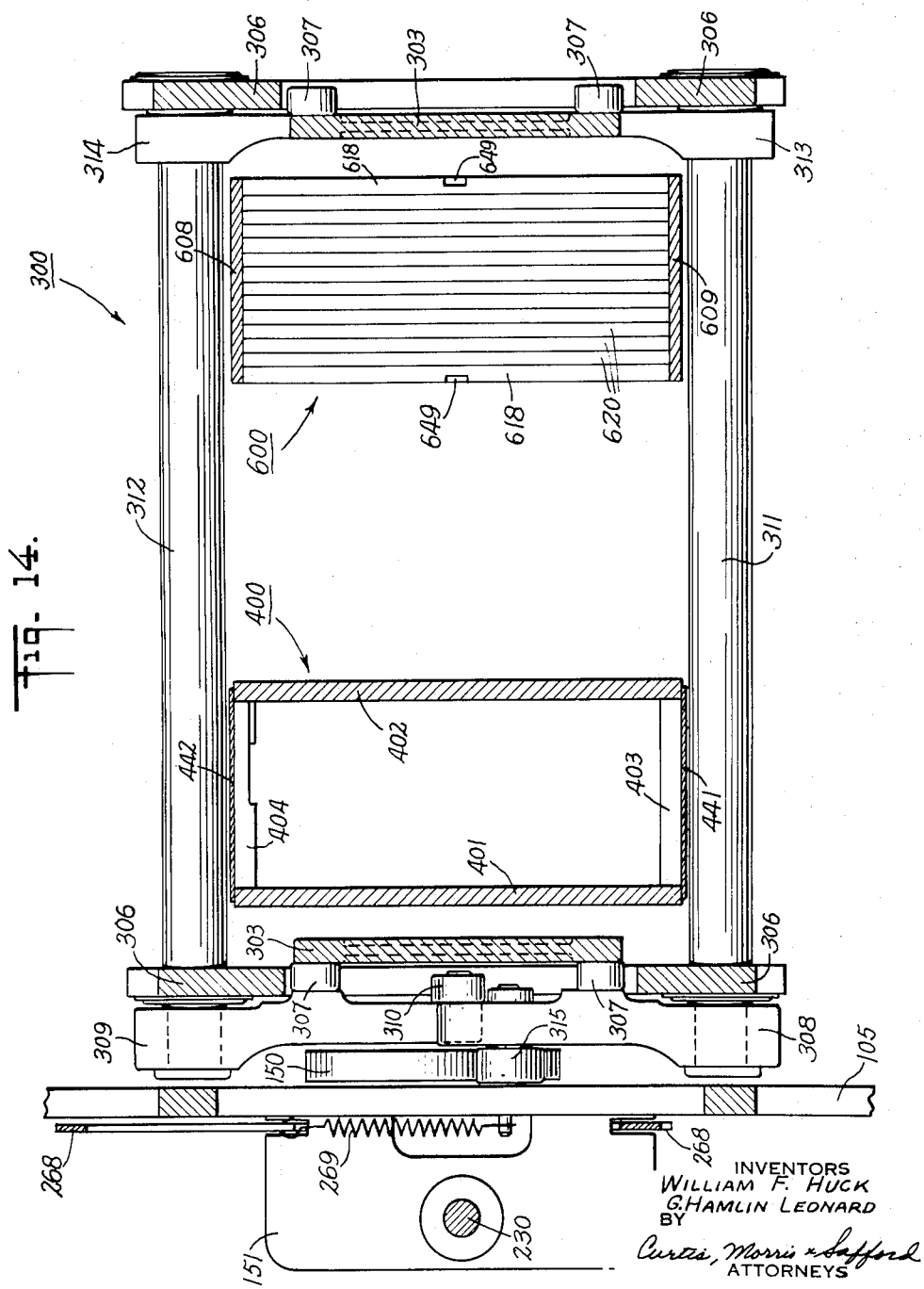

June 14, 1966  W. F. HUCK ETAL  3,256,423
SENSING MECHANISM FOR RECORD PROCESSING MACHINE
Original Filed Jan. 4, 1957  17 Sheets-Sheet 1
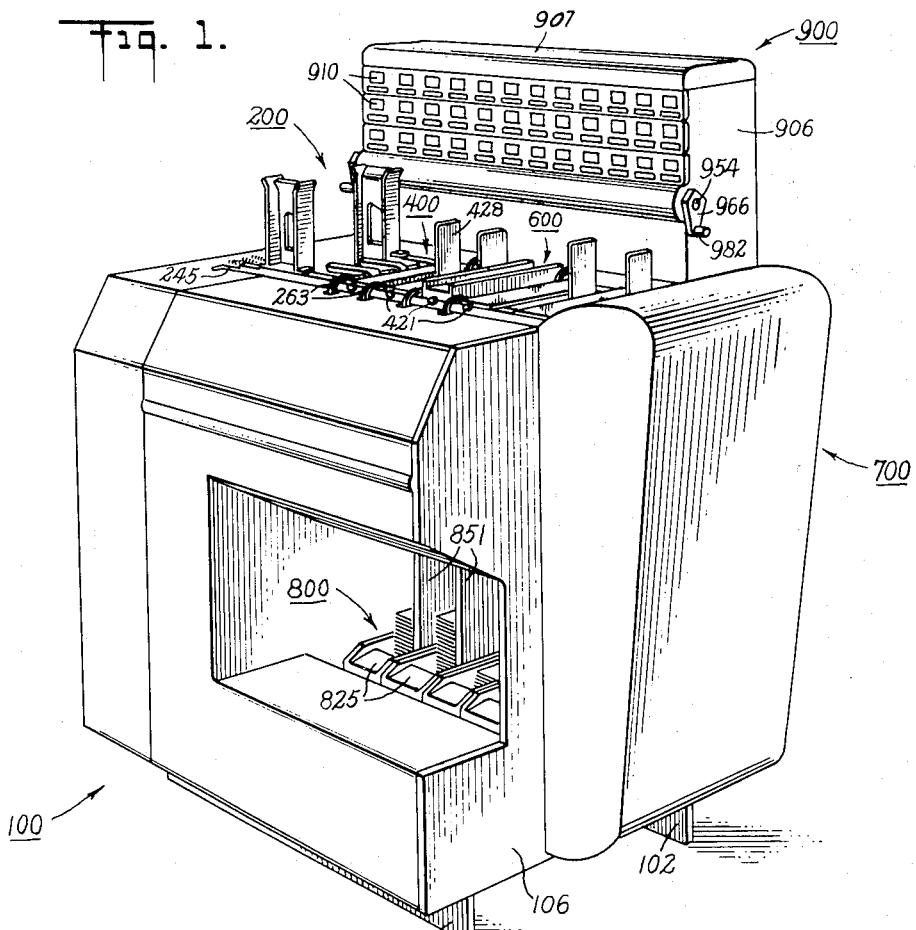
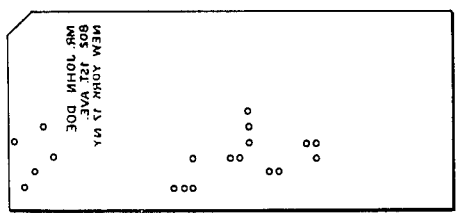
INVENTORS
WILLIAM F. HUCK
G. HAMLIN LEONARD
BY
Curtis, Morris & Safford
ATTORNEYS

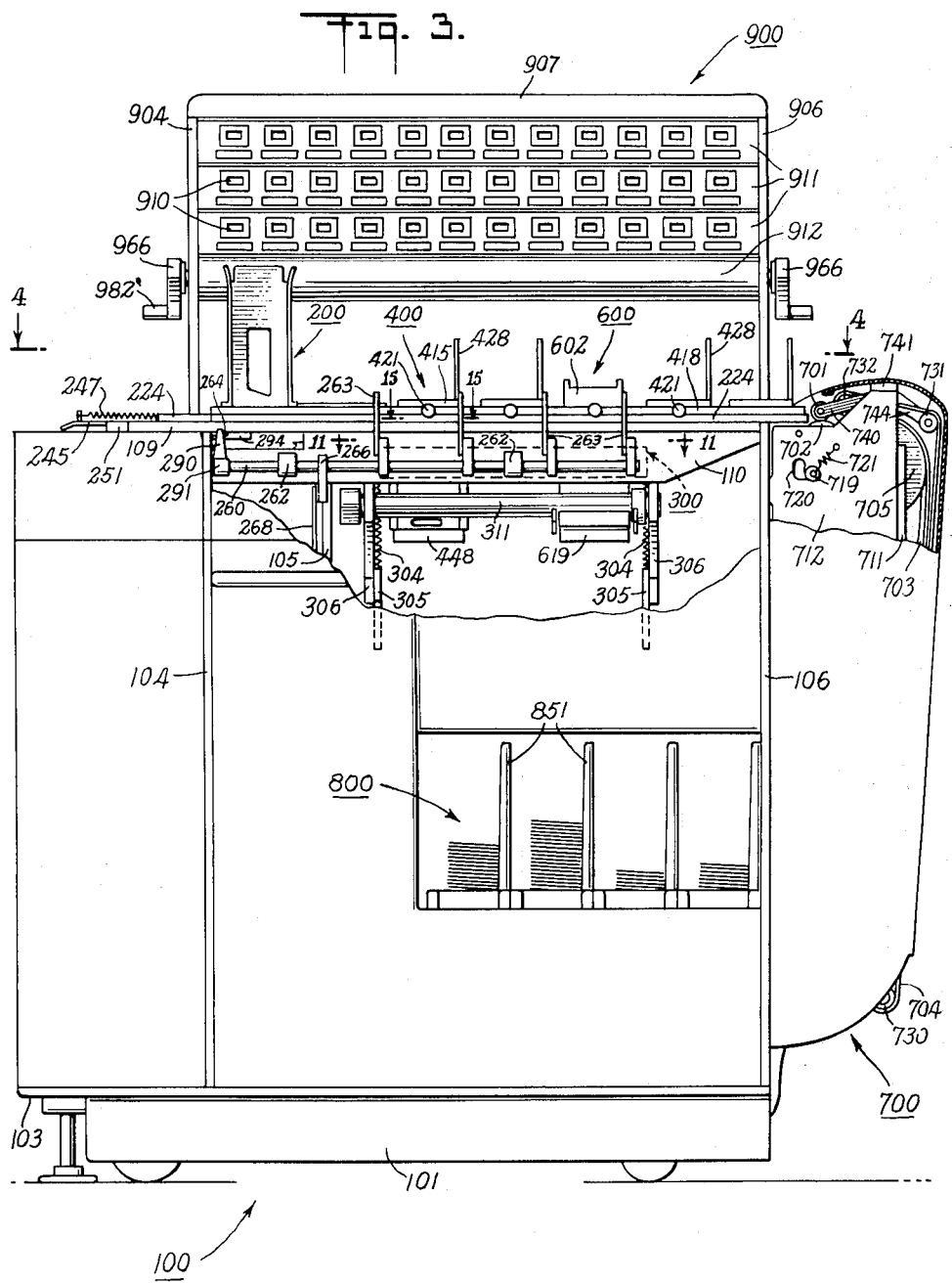

June 14, 1966  W. F. HUCK ETAL  3,256,423
SENSING MECHANISM FOR RECORD PROCESSING MACHINE
Original Filed Jan. 4, 1957  17 Sheets-Sheet 3
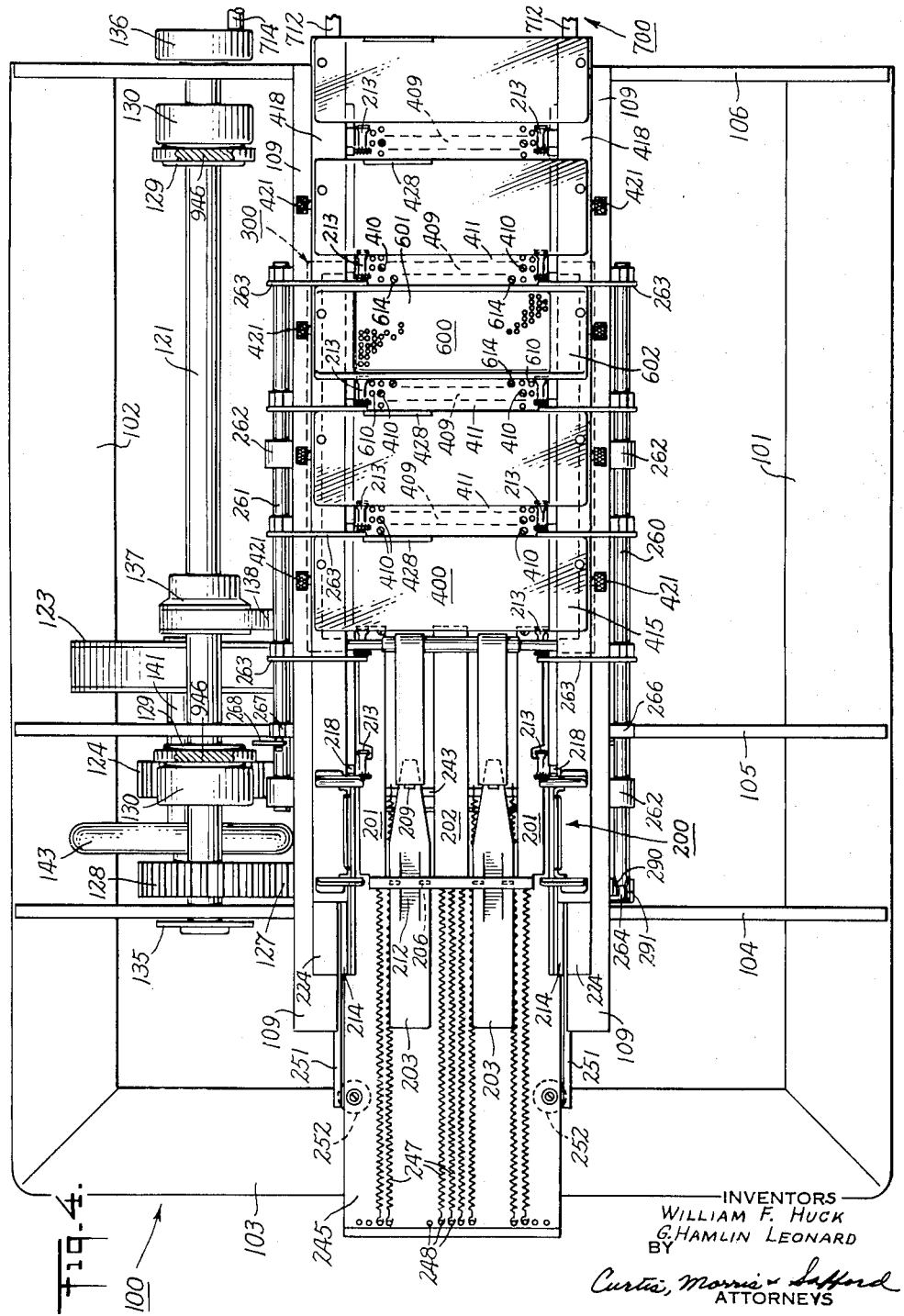
INVENTORS
WILLIAM F. HUCK
G. HAMLIN LEONARD
BY
Curtis, Morris & Safford
ATTORNEYS

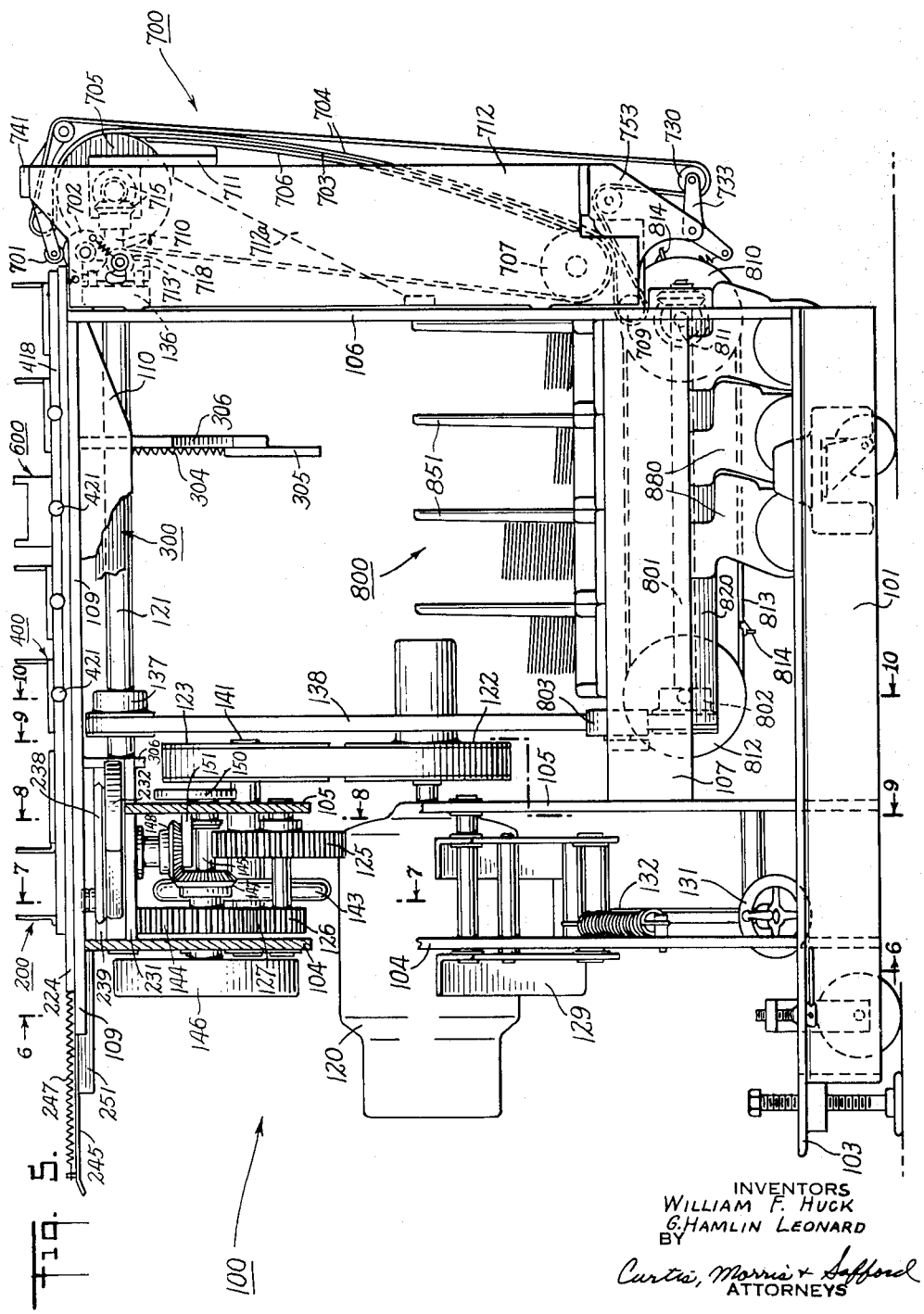

June 14, 1966  W. F. HUCK ETAL  3,256,423
SENSING MECHANISM FOR RECORD PROCESSING MACHINE
Original Filed Jan. 4, 1957  17 Sheets-Sheet 5
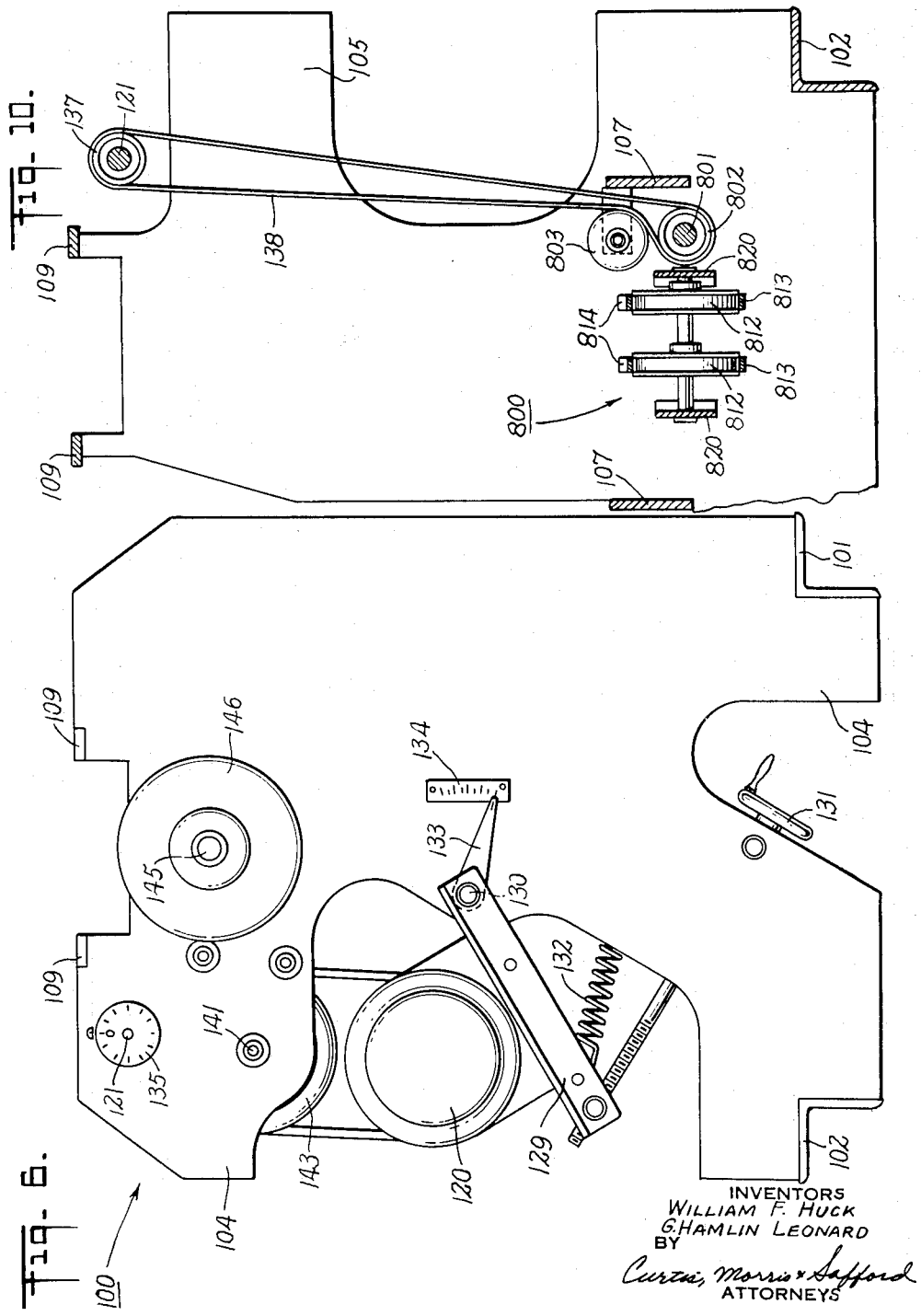
INVENTORS
WILLIAM F. HUCK
G. HAMLIN LEONARD
BY
Curtis, Morris & Safford
ATTORNEYS

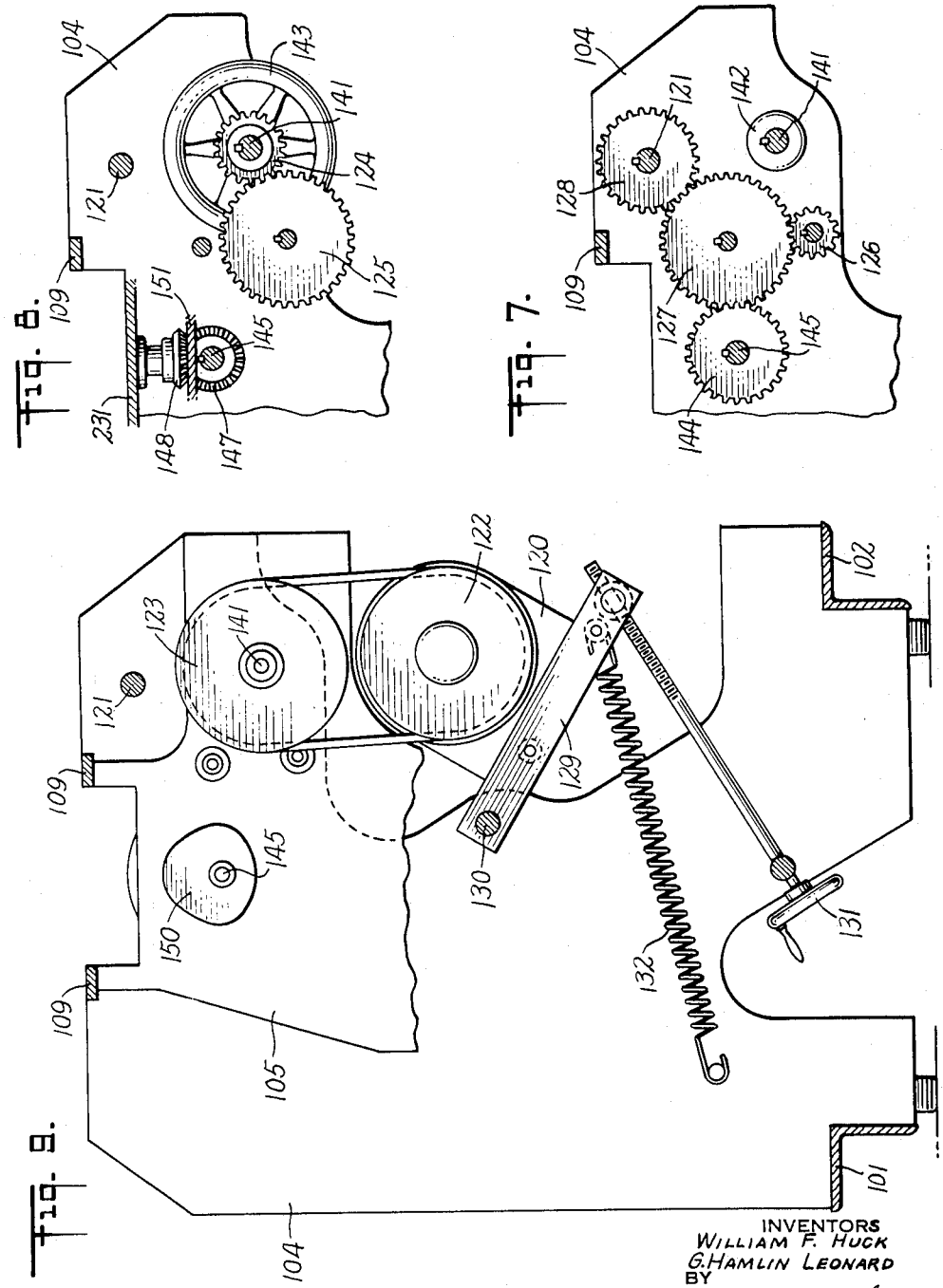

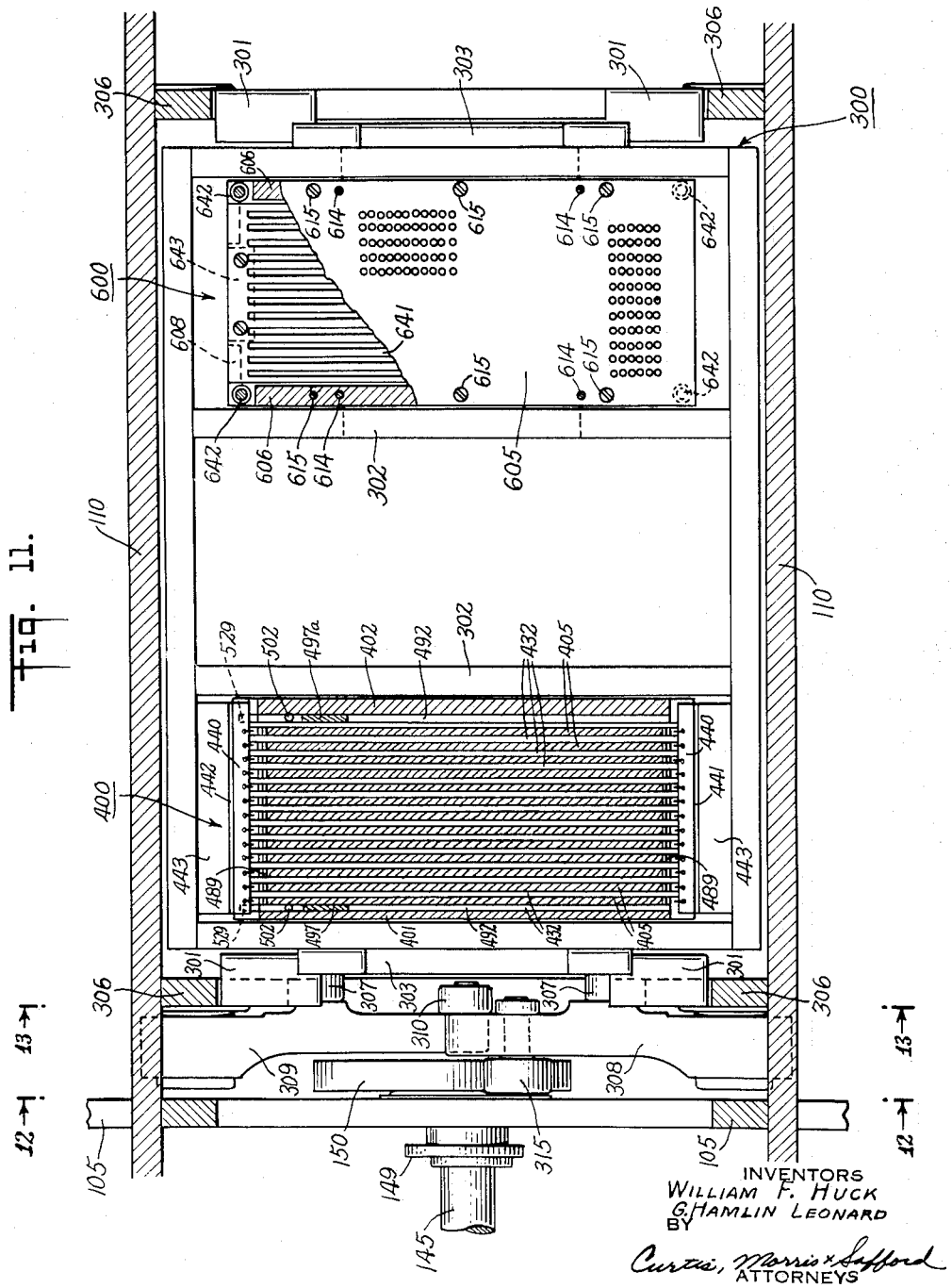

June 14, 1966 W. F. HUCK ETAL 3,256,423
SENSING MECHANISM FOR RECORD PROCESSING MACHINE
Original Filed Jan. 4, 1957 17 Sheets-Sheet 8
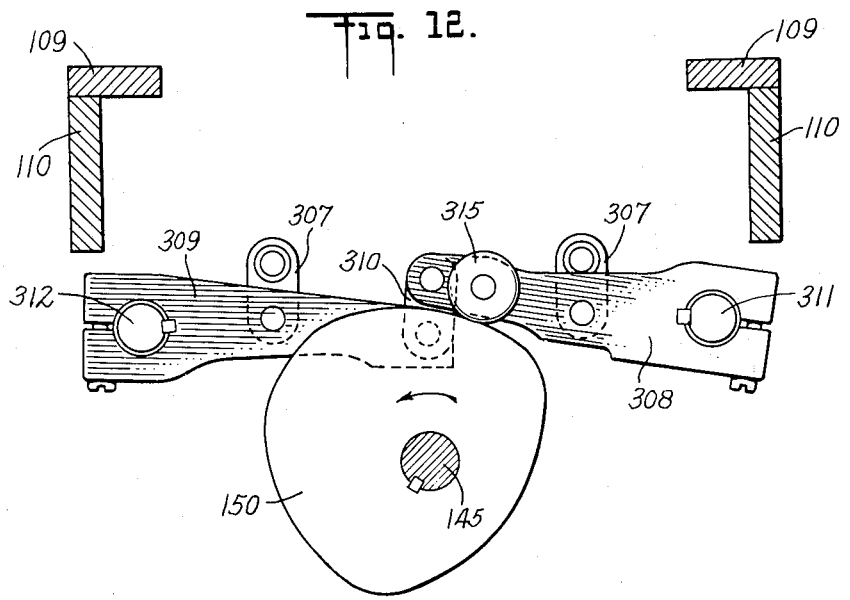
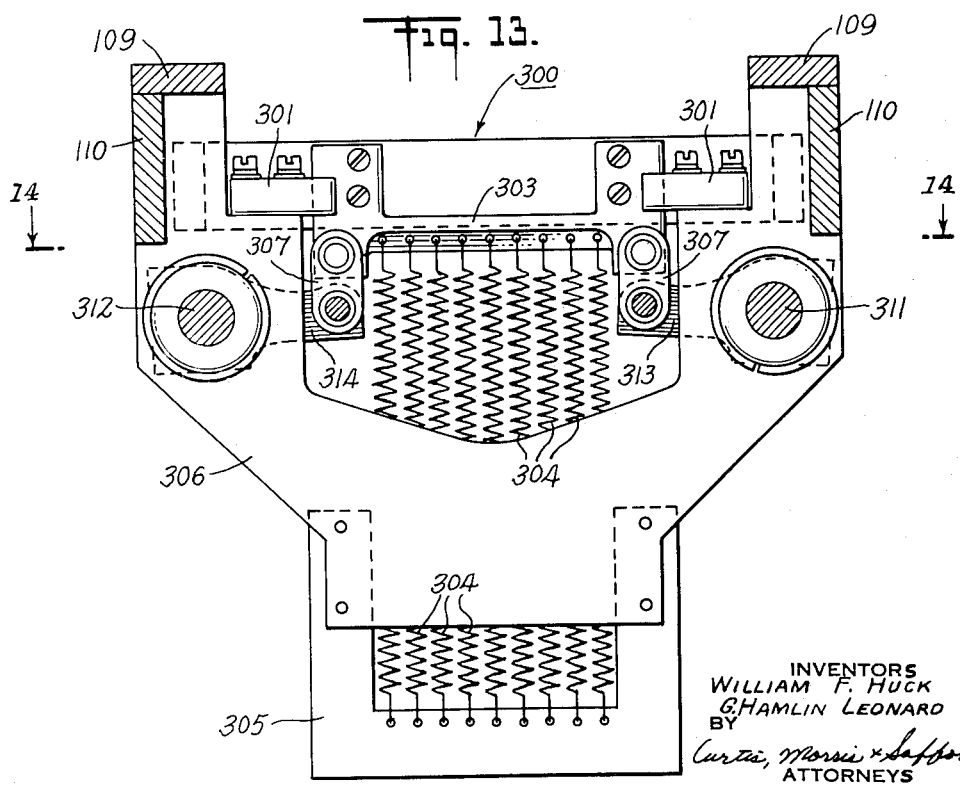
INVENTORS
WILLIAM F. HUCK
G. HAMLIN LEONARD
BY
Curtis, Morris & Safford
ATTORNEYS

June 14, 1966

W. F. HUCK ETAL 3,256,423

SENSING MECHANISM FOR RECORD PROCESSING MACHINE

Original Filed Jan. 4, 1957

17 Sheets-Sheet 9

INVENTORS
WILLIAM F. HUCK
G. HAMLIN LEONARD
BY
Curtis, Morris & Safford
ATTORNEYS

Fig. 17.

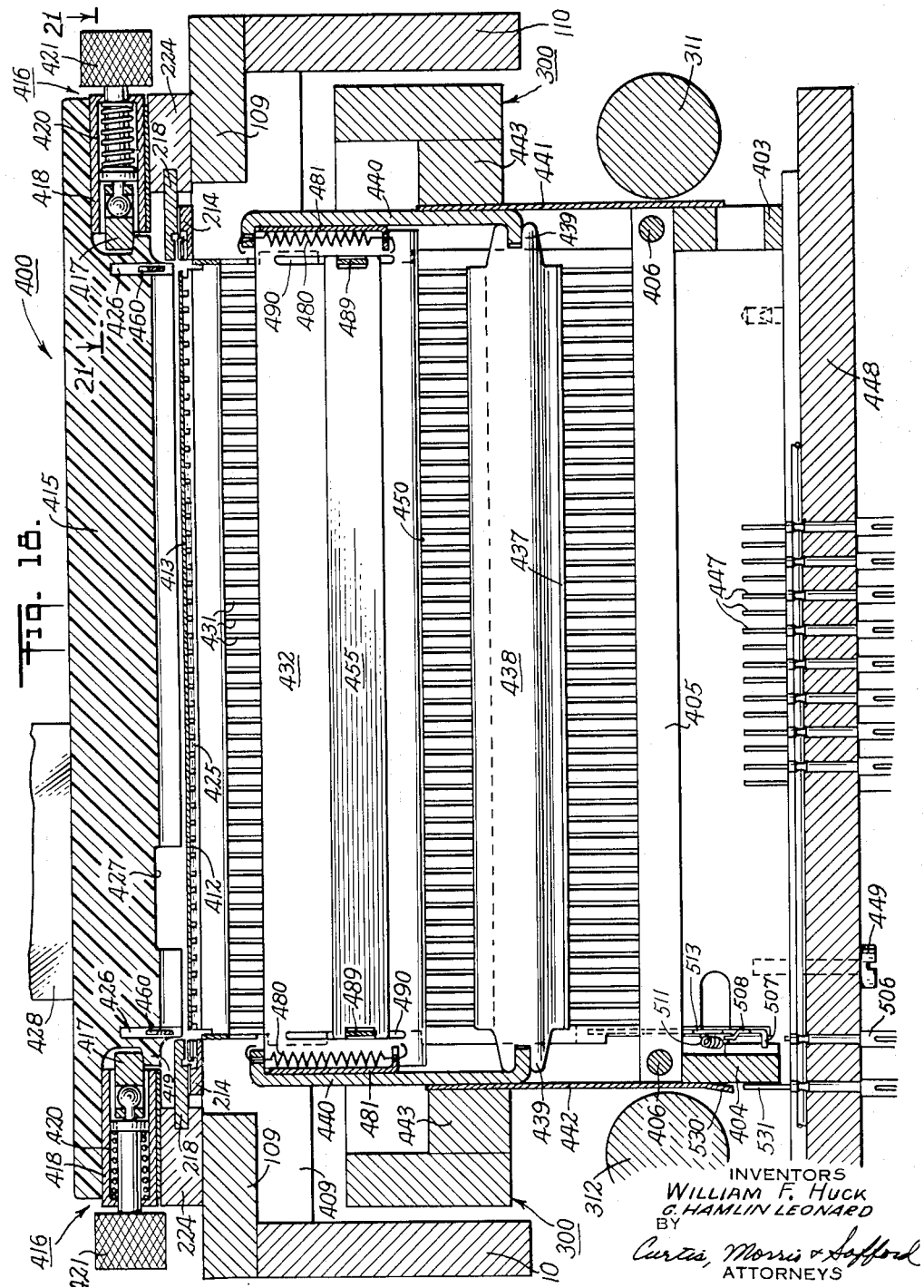

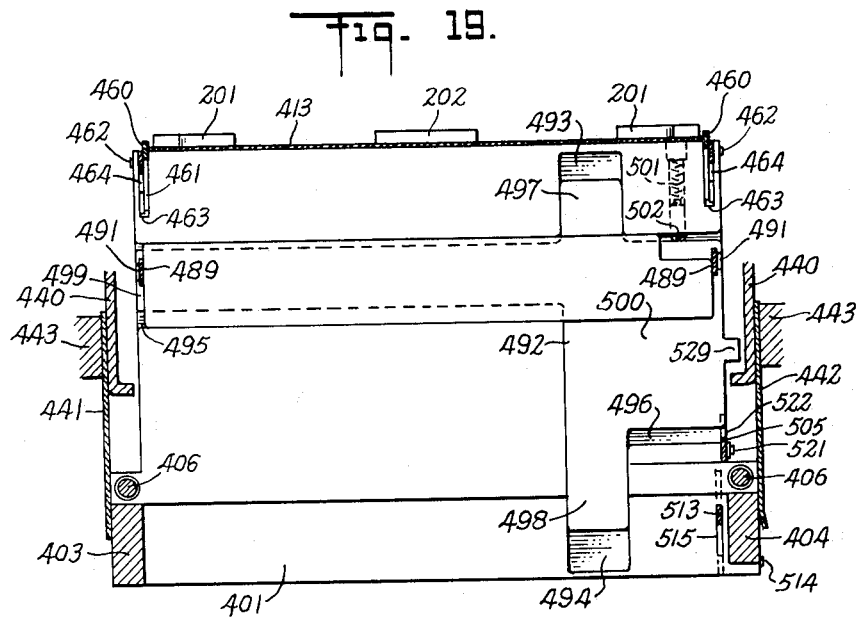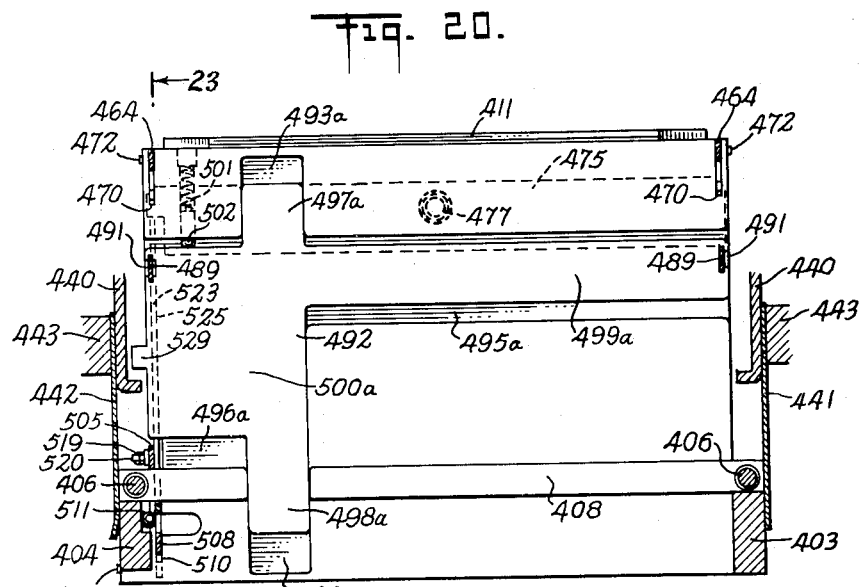

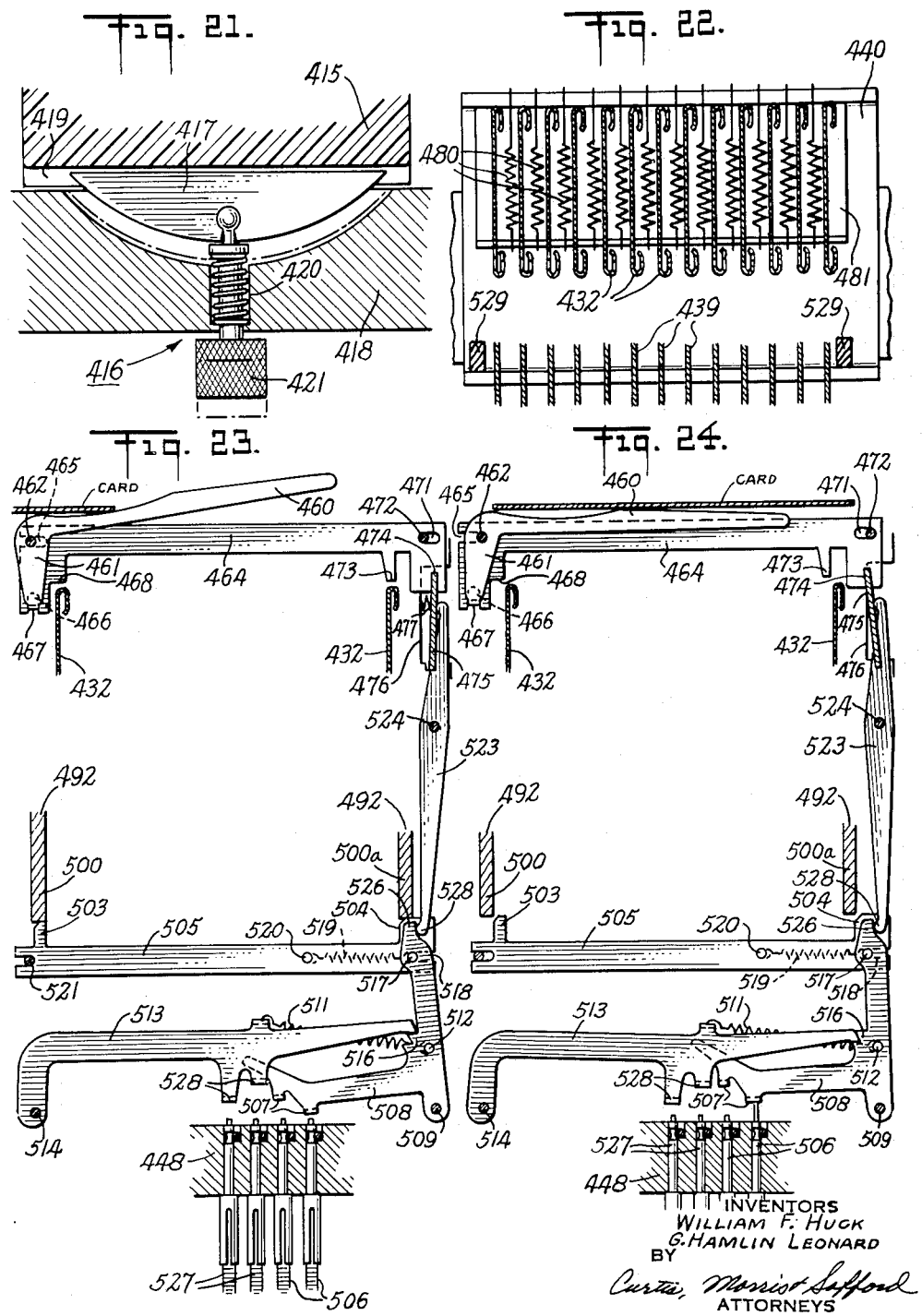

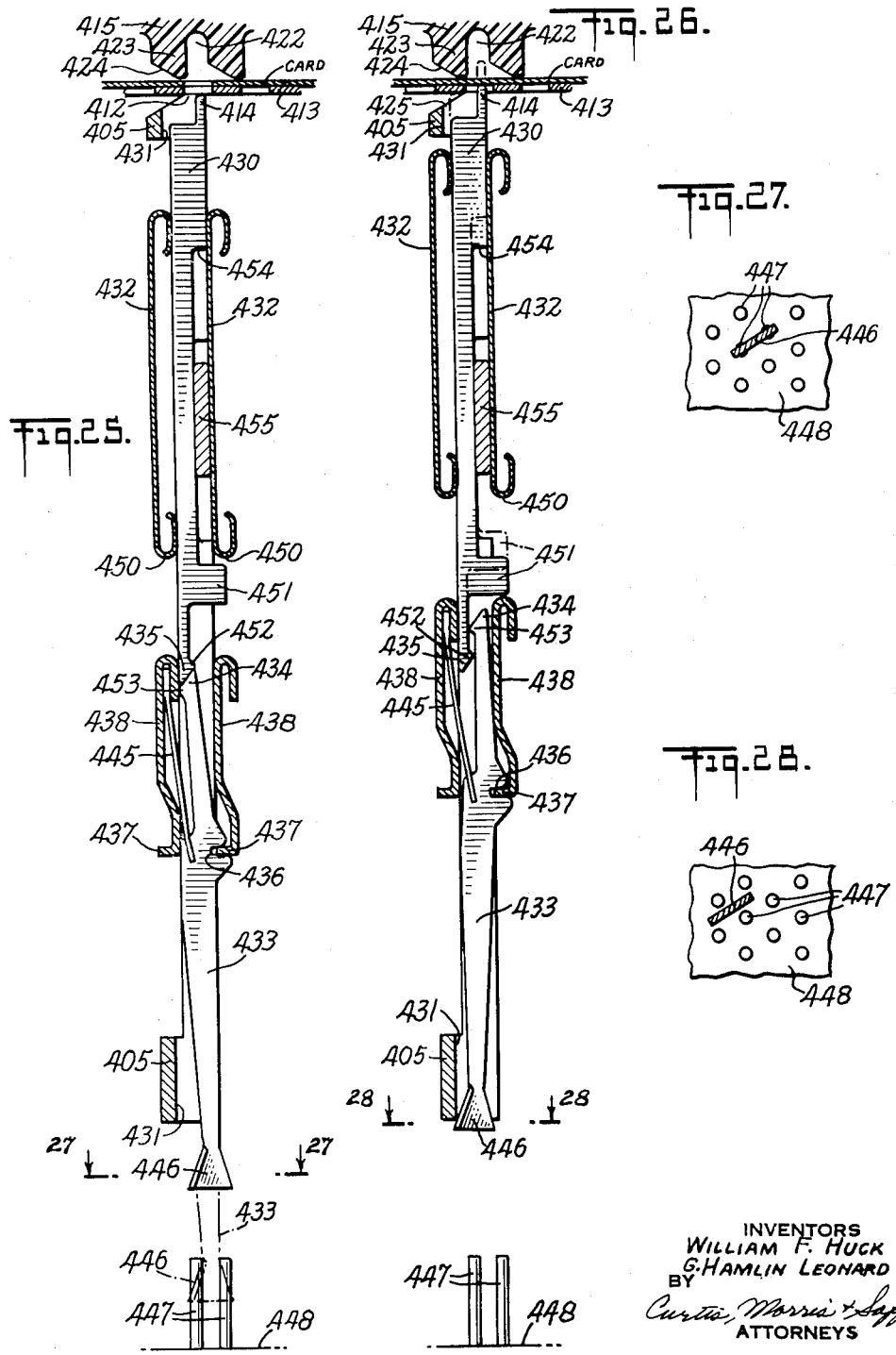

June 14, 1966    W. F. HUCK ETAL    3,256,423
SENSING MECHANISM FOR RECORD PROCESSING MACHINE
Original Filed Jan. 4, 1957    17 Sheets-Sheet 17

INVENTORS
WILLIAM F. HUCK
G. HAMLIN LEONARD
BY
ATTORNEYS

United States Patent Office 3,256,423
Patented June 14, 1966

1

3,256,423
SENSING MECHANISM FOR RECORD
PROCESSING MACHINE
William F. Huck, Forest Hills, N.Y., and George H.
Leonard, Darien, Conn., assignors, by mesne assignments, to William F. Huck, doing business as Huck
Company, New York, N.Y.
Original application Jan. 4, 1957, Ser. No. 632,525, now
Patent No. 3,070,366, dated Dec. 25, 1962. Divided
and this application Nov. 29, 1962, Ser. No. 260,935
12 Claims. (Cl. 235—61.11)

This invention relates to an improved business machine and more particularly to improvements in a machine for sensing information on punched cards; and this application is a division of our prior application, Serial No. 632,525, filed January 4, 1957, and entitled, "Record Processing Machine," now Patent Number 3,070,366, issued December 25, 1962.

The machine of the invention is useful by itself for a variety of tasks such as punching record indicia in the form of perforations in record cards, sensing data on record cards and providing a statistical analysis thereof, and sorting record cards into categories based on the information sensed from or punched on the cards.

The machine is also useful for driving and/or directing the activities, e.g., the printing of bills, dick strips and the like, of one or more auxiliary machines in response to information sensed from record cards processed in the machine or abstracted directly from said cards in such auxiliary units. In addition, the machine of the invention, whether used with or independently of such units, is useful in combination with computers, memory devices and the like for such tasks as punching more detailed information on a card at one station in the machine in response to signals from a memory device acting on abbreviated information sensed at a previous station and relayed to the memory device.

Generally, the machine of the invention comprises a combination of assemblies, each of which contributes to the processing and feeding of record cards or the like at speeds of the order of 130 to 390 per minute from a magazine, over sensing and punching stations, and through a card return unit to a stacking and sorting unit while recording statistical information in a counter assembly.

The machine and its major component parts have a considerable number of unique features and important advantages. One outstanding advantage is that the machine is readily adaptable to sensing and/or recording information on cards in the form of round holes or more closely spaced rectangular perforations in accordance with prevailing practices, and of being equally adaptable to other indicia-recording systems as well. Another advantage is that the sensing and/or punching of information can, if desired, be restricted to a preselected area of the record cards.

Still another advantage and most unique feature is that the operating parts, particularly of the sensing and punching assemblies, are situated under rather than around or over the travel path of the cards, thus making the cards visible at all times, while said assemblies are themselves readily accessible and replaceable. Further, the sensing assemblies are provided with means for automatically interrupting their respective operations when a card is not presented, or is improperly presented, to them and, upon signal, for repeating their operations in identical manner even though, in the case of the sensor, no new cards are presented and, in the case of the punch, no new signals are received.

The sorting and stacking assemblies, like the sensing, punching, card return and counter assemblies, have the

2 advantage, common to them, of being modular in the sense that their number and location can readily be altered to suit. Thus, for example, the sensing and punching assemblies are interchangeable, being mounted and operated in substantially the same manner; the card return is equally effective whether mounted directly on the basic machine or on an auxiliary device some distance away; the stacker assembly can collect the processed record cards in a single stack, in up to four preselected categories as indicated by signals received from the sensor or an external source if the basic unit alone is used, or in as many as about sixty categories if a sufficient number of auxiliary units are connected to the basic unit embodying this invention; and the counter assembly can readily be adapted to accommodate an almost indefinite number of counters.

Many of the assemblies, particularly the sensing, assembly operates on the principle of effectively translating the relatively weak impulse of an actuated signal device into a force, derived from the machine drive, of sufficient strength to accomplish an intended function such as sending a signal from a sensor. Furthermore, and perhaps most important for speed of operation, these translations of relatively weak impulses into relatively strong actuating forces advantageously take place while the impulses for the next cycle are already being prepared.

These and innumerable other advantages, as well as the utility of the machine embodying the invention and subcombinations thereof will become apparent from the following description of a specific embodiment selected for illustrative purposes only, said description being made with reference to the accompanying drawings, wherein:

FIGURES 1 to 10, inclusive, illustrate the general arrangement and drive mechanism of the basic unit. FIGURE 1 is a perspective view of the assembled unit; FIGURE 2 is a view of a typical card; FIGURE 3 is a front view of the assembled unit with the casing broken away; FIGURE 4 is a plan view of the table taken on section line 4—4 of FIGURE 3; FIGURE 5 is a front view of the machine with the housing removed to show the drive mechanism, the counter assembly being omitted; and FIGURES 6 to 10, inclusive, are sectional views taken on the correspondingly numbered section lines in FIGURE 5.

FIGURES 11 to 14, inclusive, illustrate a work operator mechanism for actuating the sensor and punching mechanisms. FIGURE 11 is a plan view taken on section line 11—11 of FIGURE 3; FIGURES 12 and 13 are sectional views taken on the correspondingly numbered section lines of FIGURE 11; and FIGURE 14 is a horizontal section taken on section line 14—14 of FIGURE 13.

Figure 15:
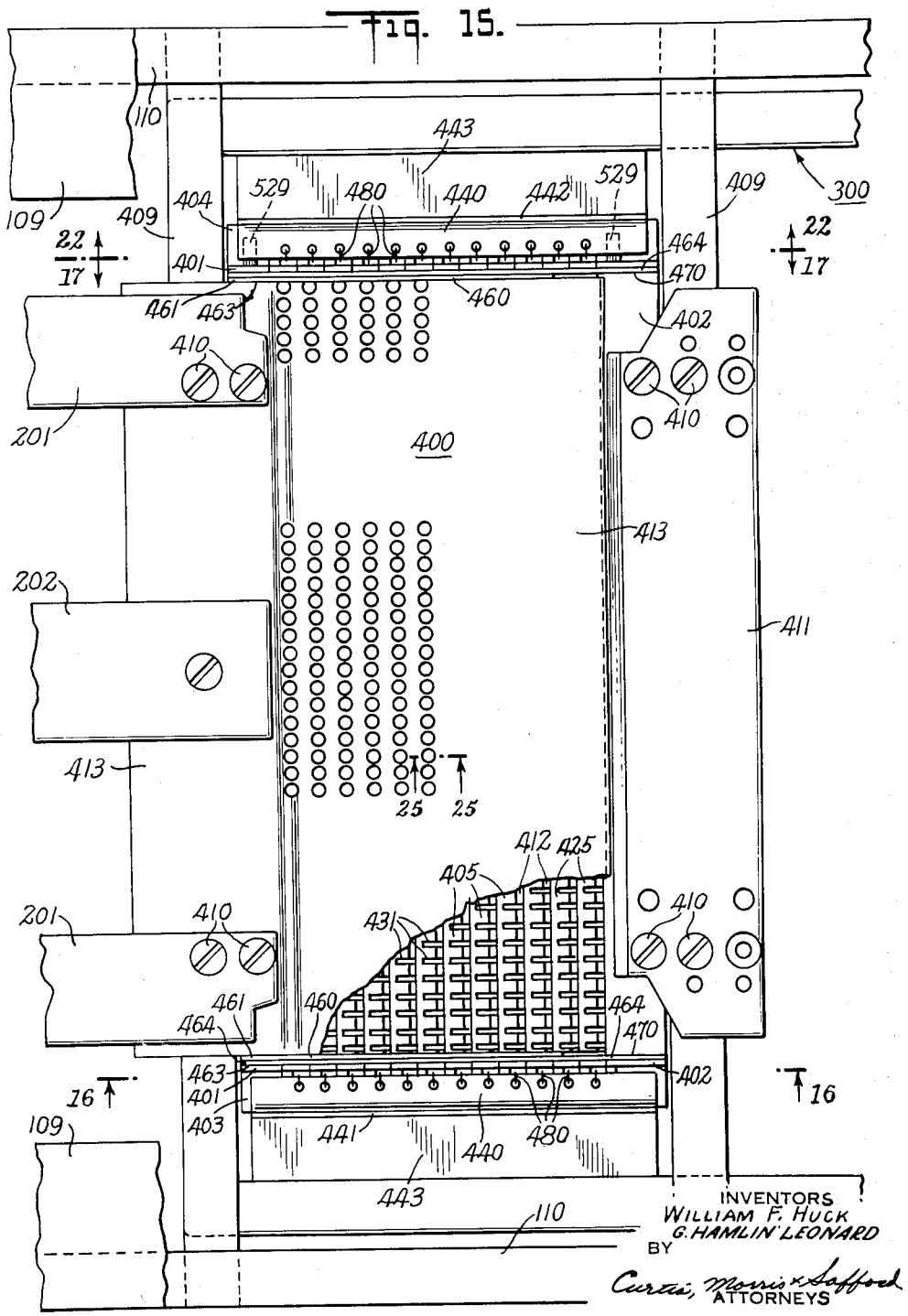
Figure 16:
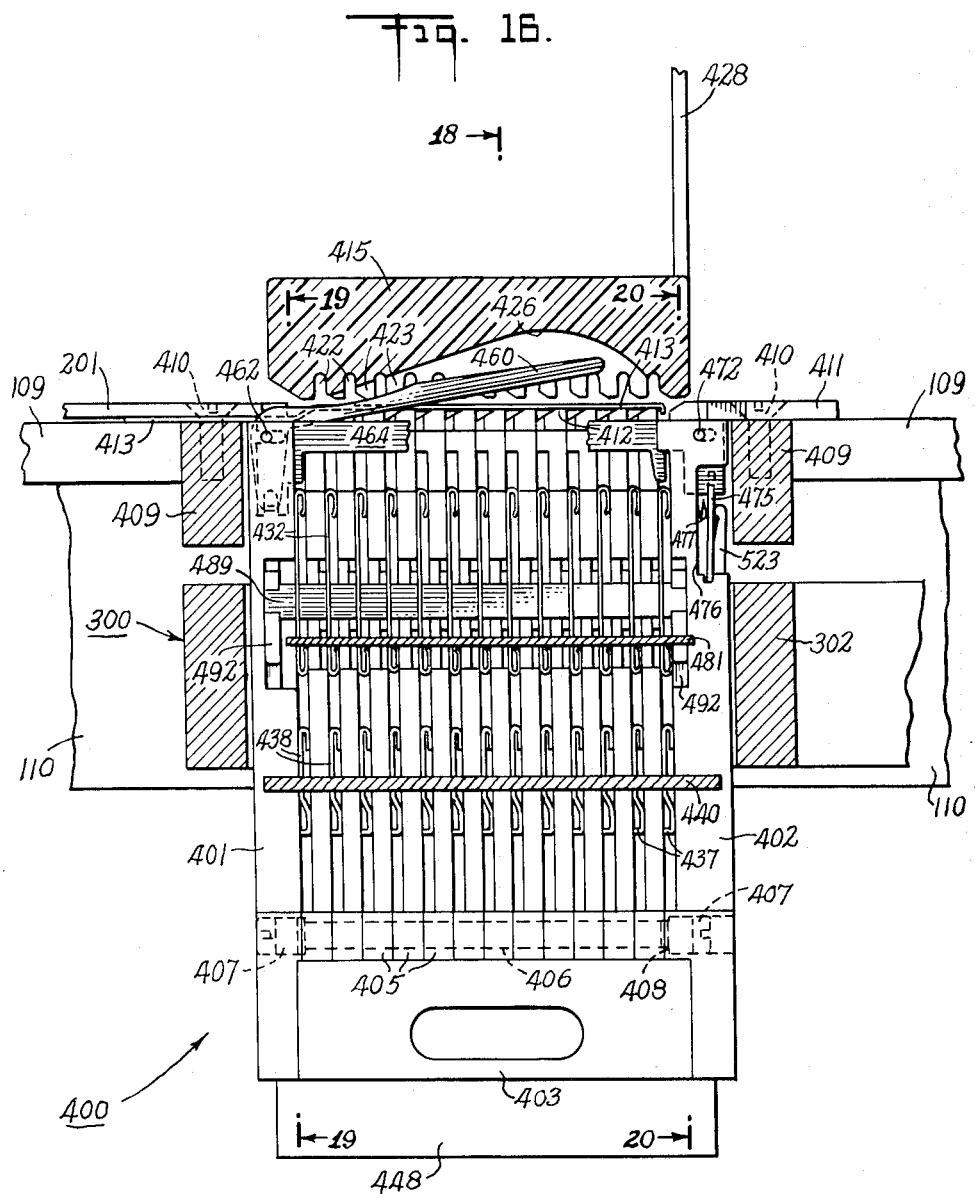
Figure 30:
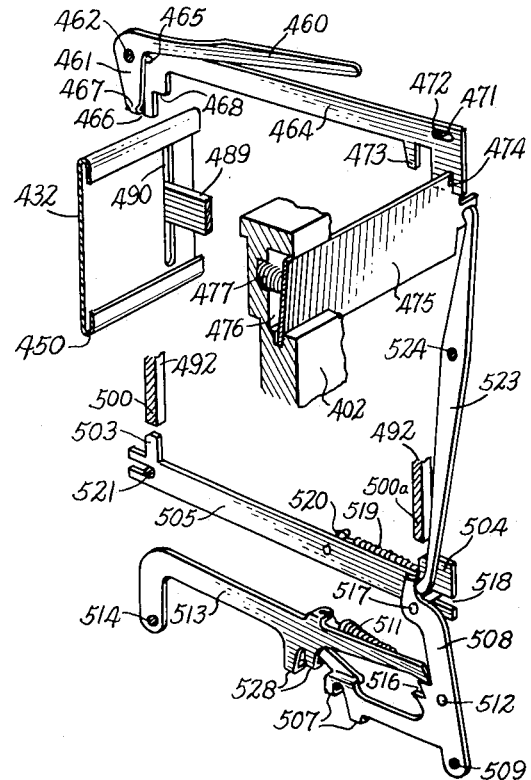
Figure 29:
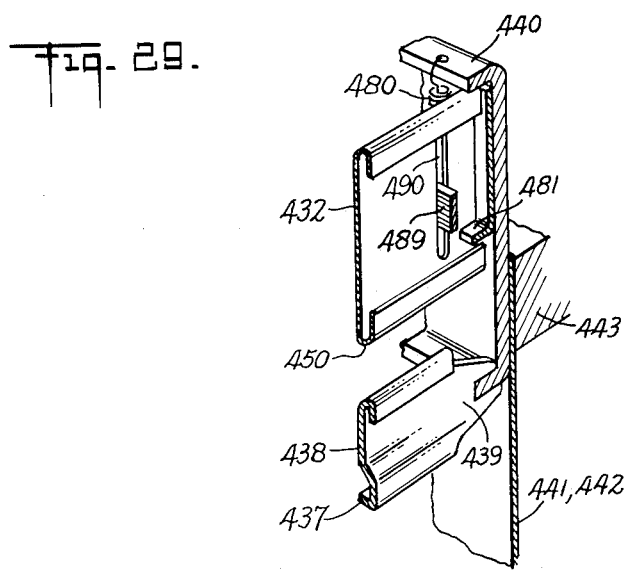

FIGURES 15 to 30, inclusive the sensing assembly 400, shown schematically in FIGURES 1 and 3. FIGURE 15 is a plan view taken on section line 15—15 of FIGURE 3; FIGURES 16 and 17 are opposite end views taken on the correspondingly numbered section lines of FIGURE 15; FIGURE 18 is a longitudinal section taken on section lines 18—18 of FIGURE 16; FIGURES 19 and 20 are views taken in opposite directions on the correspondingly numbered section lines of FIGURE 16; FIGURE 21 is a plan view taken on section line 21—21 of FIGURE 18; FIGURE 22 is a view taken on section line 22—22 of FIGURE 15; FIGURE 23 is a view taken on section line 23—23 of FIGURE 20; FIGURE 24 is a view similar to FIGURE 23 showing another position of the parts; FIGURE 25 is a view, on an enlarged scale, taken on section line 25—25 of FIGURE 15; FIGURE 26 is a view similar to FIGURE 25 showing the parts in a different position; FIGURES 27 and 28 are plan views taken on the correspondingly numbered section lines in FIGURES 25 and 26, respectively; FIGURE 29 is a detail in perspective illustrating the support and operating means for the guide channels; and FIGURE 30 is a perspective view of the elements illustrated in FIGURES 23 and 24.

General assembly

The basic unit 100 of the machine of the invention comprises mechanism for advancing record cards such as illustrated in FIGURE 2 individually and in rapid succession from a magazine 200 along the top of the unit 100 to one or more sensing stations 400 and punching stations 600, as illustrated in FIGURES 1 and 3. The basic unit may be, preferably is, provided with a stacker 800 for selectively collecting record cards that have passed through the sensing and punching stations into two or more classified stacks, a card return 700 that may be attached directly to the basic unit 100, as shown, or to the last one or more auxiliary units operated by and in conjunction with the basic unit, and a counter 900.

The structural framework of the basic unit 100 includes, as best shown in FIGURES 4 to 10, a lower U-frame comprising front and rear frame members 101 and 102 and a transverse frame member 103, vertical bulkheads 104, 105 and 106, front and rear longitudinal braces 107 and 108 and upper longitudinal members 109 and 110. For mobility, the basic unit is provided with casters 111 and, for levelling, with suitable levelling devices 112.

Drive mechanism of basic unit

The drive for powering the card return, stacker, counter and any auxiliary units between the basic unit and the card return is from a motor 120 to a main drive shaft 121 by way of a belt-connected variable pitch pulley 122 and companion sheave 123, and a gear train 124, 125, 126, 127, 128 for rotating the main drive shaft 121 at a speed of one revolution per machine cycle. To adjust this speed by means of the belt-connected variable speed pulleys 122 and sheave 123, the motor 120 is mounted on a rack 129 pivoted on a pin 130 between bulkheads 104 and 105 and adjusted to a preselected position by means of translating screw and hand wheel 131 against the action of a spring 132. Conveniently, a pointer 133 is mounted on a rack 129 at the pivot pin 130 to indicate speed on an indicator 134 calibrated in terms of cards per minute.

The main drive shaft 121 runs along substantially the entire length of the unit from bulkheads 104 to 106. At the extreme left end, the shaft is provided with a timing device 135 and at the extreme right end, as best shown in FIGURES 4 and 5, with a coupling member 136 for transmitting the drive to the card return mechanism 700 and, if desired, to one or more auxiliary units that may be interposed between the basic unit 100 and the card return unit 700. Between bulkheads 105 and 106, the main drive shaft 121 carries a geared pulley 137 and timing belt 138 for driving, likewise at precisely one revolution per machine cycle, a card stacker cam shaft 801 by way of geared pulley 802 and a tensioning idler 803, as shown best in FIGURE 10. In addition, the main drive shaft 121 carries eccentrics 129 secured thereto by collars 130 for operation of the counter mechanism 900.

To prevent reverse movement of any portion of the machine with consequent damage, maladjustment or jamming of the record cards, the shaft 141 for sheave 123 and gear 124 is provided with an anti-reverse clutch 142. A hand wheel 143 is fixed to the shaft 141 to enable the operator easily to adjust, test and clean the machine.

The idler gear 127 in the train of gears 124–128 engages a gear 144 on a work shaft 145 carrying a fly wheel 146 for steadying the drive of the machine, a miter gear 147 for driving the card feed mechanism by way of companion miter gear 148, a cam 149 for operating a card interrupt device, which is optional on the basic unit, and a cam 150 for actuating a work operator for the sensing and punching mechanism 400 and 600, respectively. The miter gear 148 is journalled for rotation between a fixed plate 231 and a lower bearing plate 151.

Work operator

The work operator is an assembly designed to provide the forces necessary to a proper operation of sensing units, punch units and possibly other units on the work table of the basic unit. Basically this is accomplished by imparting vertical reciprocation to substantially the entire sensing unit and punching unit, for example, in such a manner as to relieve sensing elements and Bowden wires, individually or in groups, from exerting the entire force necessary to perform their respective functions in a given sensing or punching operation, as will become more evident in the detailed descriptions of the sensing and punching units that are to follow.

Underneath the longitudinal frame members 109 and between the longitudinal frame members 110, and to the right of the record card magazine 200 and rails 201, 202, as seen in FIGURE 4, a rectangular frame 300 is provided for vertical reciprocation guided by four bearing blocks 301. As seen in FIGURE 11, the work operator frame 300 is divided into any desired number of sections by means of cross members 302 to accommodate sensing and punching assemblies described later.

H-shaped spring plates 303 are suitably made fast, one to each of the ends of the work operator frame 300, for carrying the upper ends of a plurality of tension springs 304. The lower ends are secured to U-shaped spring plates 305 carried by generally Y-shaped braces 306 that are secured to longitudinal frame members 109 and 110.

The work operator frame 300 is supported against the downward pulling action of the tension springs 304 by links 307 pivotally connected to the ends of the frame and also to arms 308 and 309 adjacent the left end of the work operator frame 300. The ends of the arms 308 and 309 are linked together by another link 310, as shown best in FIGURE 12. The arms are keyed to the ends of oscillatable shafts 311 and 312 which are parallel to and below the sides of the work operator frame 300. The other ends of the shafts 311 and 312 are made fast to arms 313 and 314 each carrying, like arms 308 and 309, links 307 having one end pivoted on the right end of the work operator frame 300.

The arm 308 fast on the shaft 311 is provided with a cam follower 315 for following the contour of the work operator cam 150 on the work shaft 145.

It is apparent, therefore, that as the work operator cam 150 rotates, the cam follower 315 will be urged to follow its contour by action of springs 304 so as to oscillate the arms 308 and 309, and therefore also shafts 311 and 312 which in turn oscillate the arms 313 and 314 so that the four links 307 act simultaneously and with equal force to raise and lower the work operator frame 300 once for each revolution of the work shaft 145.

Sensor

One or more sensor assemblies may, if desired, be supported on the frame for actuation by a work operator 300. In the basic unit illustrated by way of example in FIGURES 15 to 30 of the drawing, a sensor 400 is shown in the first work station immediately to the right of the rail members 201 and 202 of the card feed mechanism.

It is the function of the sensor to sense whatever perforations there are in a record card advanced to the sensing station and to transmit the sensed information to other parts of the basic unit, e.g., the punch, the counter or the stacking mechanism or any combination thereof and, if auxiliary units are operated in conjunction with the basic unit, to said auxiliary units as well. The sensing mechanism is also capable of receiving a repeat signal that will cause the sensor to lock in a sensed signal pattern and to repeat the same signal for a number of cycles depending upon the information sensed and to transmit such signals to one or more auxiliary units and, if desired, to the counter. Signal-receptive means are also provided for releasing a locked-in signal pattern.

A unique feature of the sensing mechanism described is that it can readily be adapted, as will appear, to the sensing of either circular or the more closely spaced rectangular perforations that are predominantly used in record cards today, as well as to other perforated record indicia. It is also unique in that it does not require a massive supporting structure to surround the card being sensed and therefore has the advantage of easy correction in the event of a jam. The sensing mechanism is entirely below the work table of the basic unit, only a cover plate, which is readily removable, being above the path of the cards.

As shown best in FIGURES 15 to 30, the sensor comprises a rectangular frame that includes a left face plate 401 (left as viewed from the front of the basic unit 100 and as in FIGURE 16), a right face plate 402, a front end block 403 and a rear end block 404, these frame members being fastened together rigidly by means of machine screws and locating pins, not shown.

Up to twelve intermediate plates 405 are secured between and parallel to plates 401 and 402 by means of aligning rods 406 and chamfered aligning buttons 407, the intermediate plate 405 adjacent the right face plate 402 being spaced from the interior face thereof by a ledge 408 on the plate 402.

The entire frame, including plates 401, 402 and 405, and blocks 403 and 404, is supported on cross braces 409 between longitudinal frame members 109 and 110, at the left side, by means of rails 201 and 202 and machine screws 410 threaded into left face plate 401 and at the right side by means of a bevelled plate 411 and machine screws 410 threaded into right face plate 402.

The upper ends 412 of the intermediate plates 405 form a sensing table that is preferably covered by a cover 413 on which a card rests while in sensing position. The cover has holes large enough to permit penetration by sensor fingers 414 but small enough to prevent chad accidentally entrained with the cards from entering the sensor, as shown in FIGURE 15, and secured, under rails 201 and 202, to the left cross brace 409.

To help maintain a record card that has been advanced to the sensing position by the assemblies 214–218 reciprocating longitudinally in the grooves 223 of the rails 224 and properly positioned over the sensing station by a pair of spring-biased stops 213 against the upward thrust of sensor fingers 414, a cover 415 is releasably locked over and across the path of the cards by suitable snap locks 416. As shown best in FIGURES 18 and 21, the locks 416 comprise plates 417 slidable in longitudinal blocks 418 for engaging lips 419 of the cover 415 under the action of springs 420. The cover 415 can, therefore, readily be removed if desired simply by pulling knobs 421 and lifting.

To enable the sensor fingers 414 to move through a card perforation, as shown in phantom in FIGURE 26, the underside of the cover 415 is provided with longitudinal grooves 422. The ribs 423 formed between the grooves 422 are suitably bevelled as shown at 424 to assist in properly guiding the record cards and spaced to avoid sensor fingers penetrating through either round holes or the more closely spaced rectangular perforations of cards being processed. The tops of the intermediate plates 405 are preferably also bevelled, as shown at 425, particularly if operation without the cover 413 is contemplated.

As shown best in FIGURES 16 to 18, the underside of the cover 415 is preferably also provided with narrow transverse grooves 426 to accommodate a card detecting mechanism, and a wider transverse groove 427 for avoiding contact, and possible smearing, of printed matter on the faces of the cards. To assist in reading the printed matter, which is often applied to the cards in reverse, the cover is preferably made of a transparent material and provided with a mirror 428.

With the exception of the sensor fingers 414, the parts of the sensor mechanism thus far described remain stationary during operation.

The sensor fingers 414 are, as shown best in FIGURES 25 and 26, the upper extremities of sensor slides 430, which are slidable vertically in the slots 431, as shown in FIGURE 15, of the intermediate plates 405. Inasmuch as the construction and operation of all the sensor slides are alike, the description thereof with reference to one sensor slide 430 will suffice.

In the reset position illustrated in FIGURE 25 the sensor slide 430, confined for vertical movement in the slot 431 by adjacent sensor guide channels 432 parallel to and between the plates 430, is pushed upward by upward movement of a flipper 433 in the same slot 431, the cammed head 434 thereof being in engagement with the cammed foot 435 of the slide 430.

The flipper 433 has a notch 436 engaged by the toe 437 of a flipper channel 438 mounted at its ends 439, as shown best in FIGURE 18, on front and rear operating channels 440 for vertical reciprocation between adjacent intermediate plates 405. The operating channels 440, together with a front face plate 441 and a rear face plate 442, are secured by means of mounting blocks 443 to the work operator frame 300. It will be apparent, therefore, that as the work operator frame 300 moves up and down once during each revolution of the work shaft 145 and as determined by the contour of the work operator cam 150, the operating channels 440 and face plates 441, 442, and therefore the flippers 433, will likewise be raised and lowered.

In order to urge the sensor slide 430 to rise and thereby the finger 414 to sense a record card in the sensing position when the flipper 433 rises, the flipper is biased for counterclockwise rotation about the toe 437 of the flipper channel, as seen in FIGURE 25, by means of a spring 445, the upper and lower ends of which are anchored in the upper bend of the next adjacent flipper channel 438 and in the body of the flipper 433, respectively. This, as well as the movement applied to the flipper by upward movement of the toe 437, urges the cammed head 434 against the foot 435 and so transmits the upward movement of the work operator frame 300 to the sensing finger 414.

If there is a perforation in the card at the position being sensed by the finger 414, as illustrated in FIGURE 25, the finger encounters no obstruction to movement into a groove 422 of the cover 415, thus permitting the sensor slide 430 and flipper 433 to move upward without changing their positions relative to one another. The flipper 433 is lowered on the downstroke of the flipper channel 438 in the position shown in FIGURE 25 to thereby engage and press down with its foot 446, as illustrated in FIGURE 27, staggered Bowden cables 447 protruding upward from a Bowden terminal plate 448 made fast to the underside of the sensor frame by means of machine screws 449 threaded into the left and right face plates 401, 402. The signalling of a perforation is, therefore, accomplished by pushing the corresponding Bowden ends while the sensed card is moved to its next station.

Before proceeding further with the description, it is noted that the sensing and signalling mechanism described is as readily adaptable to record cards having more closely spaced rectangular perforations as it is to those having round holes, the only departures from the mechanism specifically described herein for illustrative purposes being that the intermediate plates 405 would be provided with a correspondingly greater number of more closely spaced slots 431 to accommodate the greater number of sensor slide and flipper assemblies 430, 433 required, and the feet 446 of the flippers would be made smaller so as directly to actuate one rather than two Bowden cables in view of the limitation on the spacing thereof.

It is to be understood also that in many instances there is no necessity for sensing more than a limited area of the record cards to be sensed. It is within the scope of the invention, therefore to include a lesser number of sensor slide and flipper assemblies 430, 433, guide channels 432 and flipper channels 438 than can be accommodated within the confines of the sensor frame members 401–404.

Simultaneously with the downward movement of the flipper 433 actuated by the flipper channel 438, the raised sensor slide 430 (the finger 414 not having been obstructed from moving into a groove 422) is urged to follow and remain in contact with the flipper 433 by the action of the foot 450 of the descending guide channel 432 against a lug 451 so that the finger 414 will be withdrawn from a sensed perforation in a card. The guide channels 432, being fitted at their ends under the upper rails of the operating channels 440, as shown in FIGURE 18, move downwardly with the latter and, therefore simultaneously with the flippers 433.

If, on the other hand, there is no perforation in the card at the position being sensed by the finger 435, the sensor slide 430 is prevented, on the upstroke of the work operator frame 300, from moving any higher than the position indicated in solid lines in FIGURE 26. This forces the cam surface of the flipper head 434 to slide over the cam surface of the sensor slide foot 435, causing the flipper 433 to rotate clockwise against the action of spring 445 to the position shown in FIGURE 26 as the flipper channel 438 carries it upward. On the downstroke of the flipper channel 438, the sensor slide 430 is carried down with the flipper 433 by reason of a pinching of the slide 430 between the flipper head 434 and the adjacent flipper channel 438, and further by the engagement of heel 452 against the lip 453, until the flipper foot 446, due to the rotated position of the flipper 433, has avoided the Bowden pins 447, as shown in FIGURE 28, and come down beside them near the bottom of the stroke. At this point, the corner 454 engages a reset bar 455, thus arresting further downward movement of the slide 430 and causing the heel 452 and lip 453 to slide over one another. As soon as the upstroke has gone far enough for the foot 446 to clear the tops of the Bowden ends 447, the flipper snaps back to the position shown in FIGURE 25 under the influence of the spring 445.

To avoid having all the sensor slide and flipper assemblies 430, 433 operate to actuate a signal for all associated Bowden ends 447 when there is no record card in the sensing station, card detectors 460 are provided for movement within the transverse grooves 426 in the cover 415. The detectors 460, as shown in FIGURES 16, 17 and particularly in FIGURES 19, 20, 23, and 24, are L-shaped levers, the feet 461 of which are pivoted on pins 462 at the heel ends within slots 463, as shown in FIGURE 19, of the left face plate 401.

As shown best in FIGURES 23 and 24, a top stop slide 464 is slidably mounted next to and selectively for actuation by each card detector 460. The left end is accommodated in slot 463 of the plate 401 alongside the foot 461 of the card detector 460; it has a horizontal slot 465 for slidably engaging pin 462; it has a slot 466 engaged by a bent toe 467 on the foot of the card detector; and a stop 468 for selective abutment against the top of a guide channel 432. The right end is accommodated in and passes through a slot 470, as shown in FIGURE 20, of the right face plate 402; has a horizontal slot 471 for slidable support by a pin 472; a stop 473 for selective abutment against the top of a guide channel 432; and a vertical slot 474 for actuating a slide connector 475 mounted in a horizontal groove 476 on the outside face of the plate 402 and spring-biased by a compression spring 477 to rotate the slide connector 475 in a clockwise direction as seen in FIGURES 23 and 24.

It will be apparent that when the card detectors 460 are depressed by a card against the action of compression spring 477 between slide connector 475 and right face plate 402, the toe 467 acting in the slot 466 thereof causes the top stop slides 464 to move toward the left face plate 401 (to the left as seen in FIGURE 24) and therefore to allow the guide channels 432 to move up with the operating channels 440. When, however, a card is not detected and the arms of the detectors 460 are free to rise into their associated grooves 426, the spring 477 moves the slides 464 to the right, as seen in FIGURE 23, whereupon the stops 468 and 473 are positioned directly over the end guide channels 432. On the upstroke of the operating channels 440, the channels 432 abut the stops 468 and 473 and are therefore prevented from continuing their upward movement against the action of tension springs 480, which connect spring angles 481 to support the channels 432 resiliently against the top rails of the operating channels 440, as shown best in FIGURE 18. As a result, the feet 450 of the various guide channels 432 engage lugs 451 to hold all the sensor slides 430 down and to make the flippers 433, in their continued upstroke, pivot clockwise so that on the downstroke their feet 446 will all avoid the Bowden ends and therefore not send a signal.

The sensor 400 illustrated in the drawing is also provided with a mechanism for repeating a given combination of signals sent by actuation of a given group of Bowden ends 447 in the plate 448 without requiring a number of identical record cards equal in number to the repetitions of signal. By this means, a given card can be sensed once and then continue its passage through the machine while the signal or combination of signals transmitted to the Bowden ends by the sensor will be repeated a predetermined number of times.

To accomplish this result, the reset bars 455, which normally do not move vertically and engage the corners 454 of the sensor slides 430 on the downstroke of the operating channels 440 so as to reset the assemblies 430, 433 from the position shown in FIGURE 26 to that illustrated in FIGURE 25, are actuated to move up and down with the assemblies and thereby to mtaintain the flippers 433 in the non-striking, rotated position. To this end, the slotted ends of the reset bars 455 are supported on two lift bars 489, as shown best in FIGURE 18. The lift bars 489 pass through slots 490 of the guide channels 432 and the ends thereof are supported for simultaneous vertical movement in notches 491 of repeat sensing plates 492, as shown best in FIGURES 19 and 20. One of the plates 492 is movable vertically in a generally cross-shaped groove in the interior surface of the left face plate 401, the groove having a head portion 493, a foot portion 494, an arm portion 495 and a body portion 496. The other plate 492 is movable vertically in a similar groove in the interior surface of the right face plate 402, this groove being a mirror image of the cross-shaped groove in plate 401 and having a head portion 493a, foot portion 494a, and portion 495a and body portion 496a directly opposite the corresponding groove portions in the plate 401.

The repeat sensing plates 492, like the grooves in which they are movable, comprise head portions 497, foot portions 498, arms 499 and body portions 500. The head and foot portions 497, 498 are slidable longitudinally (vertically) in the groove portions 493 and 494 (493a and 494a of plate 402) and the arm and body portions 499, 500 carrying the ends of the lift bars 489 are slidable laterally (also vertically) in groove portions 495 and 496 (495a and 496a of plate 402). The face plates 401 and 402 are drilled at 501 to accommodate plungers 502 spring-biased against the upper surfaces of the body portion 493a, foot portion 494a, arm portion 495a and hence the reset bars 455, toward their lowermost non-operative positions.

Referring specifiaclly to FIGURE 23 showing the repeat mechanism in the non-operative position, it will be noted that the feet 500 and 500a of the repeat sensing plates 492 abut against projections 503 and 504 on an understop slide 505 under the urging of the spring plungers 502. Since the repeat sensing plates 492 cannot go down any further than the positions shown in FIGURE 23 so long as they abut projections 503 and 504, the lift bars 489 and therefore the reset bars 455 likewise cannot move down with the downstroke of the operating channel 440 with the result that the upper edges of the reset bars 455 will engage corners 454 of the sensor slides and thereby disengage the flippers 433 from the position shown in FIGURE 26 to that shown in FIGURE 25.

Upon receipt of a signal transmitted by way of either of the Bowden cables 506, shown in FIGURE 23, the cable ends engage one of the buttons 507 on a lever 508 pivoted on a pin 509 within a slot 510 in the right face plate 402. This rotates the lever 508 in a clockwise direction against the action of a spring 511 hooked at one end to the lever 508 by pin 512 and at the other end to a latch 513 pivoted on a pin 514 within a slot 515 in the left face plate 401.

Upon receiving a signal for a repeat operation and clockwise rotation of the lever 508, the end of the latch 513 engages a catch 516 on the lever 508 to lock the lever 508 into its rotated position. Also upon rotation of the lever 508 a pin 517 secured to the lever 508 is caused to move to the right, as seen in FIGURE 23, along a slot 518 in one end of the understop slide 505. A spring 519 hooked at one end over the pin 517 and at the other end over a pin 520 on the slide 505 urges the slide 505 to the right. When the operating channels 440 reach the top of the upstroke, the lower end of the channel adjacent the rear face plate 442 comes into contact with the lower edges of ears 529 on the repeat sensing plates 492 and thus briefly jog them momentarily to remove their pressure on the projections 503 and 504 and permit the understop slide 505 to slide to the right under the urging of spring 519 on the pins 517 and 521 which is mounted in a slot 522 of the left face plate 401 after receipt of a signal to inactivate the repeat mechanism.

It will become apparent that as long as the understop slide 505 is locked in the repeat position, shown in FIGURE 24, i.e., by engagement of the end of the latch 513 with the notch 516 in the lever 508 and the tension thereby applied to spring 519, the foot portions 500 and 500a of the repeat sensing plates 492 will be able to move down alongside the projections 503 and 504 under the urging of spring plungers 502. This in turn releases the lift bars 489 and therefore also the reset bars 455 so they can move down with the operating channel 440 and thereby follow the movements of the sensor slide and flipper assemblies 430, 433 to avoid disturbing their no signal relationship shown in FIGURE 26.

Ordinarily there will be no movement of record cards over the sensing station so long as the repeat signal is in effect and the understop slide 505 is in the position shown in FIGURE 24. To avoid having the card detector mechanism maintain the topstop slides 464 in the stop position shown in FIGURE 23 under the urging of spring 477, however, a connecting lever 523 pivotally mounted on a pin 524 within a vertical slot 525 in the outer face of the right face plate 402 is provided, as shown best in FIGURES 20, 23, and 24. The end 526 of the lever 508 engages the foot 528 of the lever 523 to rotate the lever about the pivot pin 524 in a counter clockwise direction and thereby to rotate the slide connector 475 counterclockwise against the action of compression spring 477 in order to maintain the topstop slides 464 in the release position, shown in FIGURE 24, so that the guide channels 432 will be free to reach the top of their stroke.

Upon receipt of a signal through either or both of Bowden wires 527 to inactivate the repeat mechanism, the latch 513 is caused to rotate counterclockwise about pivot pin 514 by the action of the Bowden ends against buttons 528, thereby releasing the end of the latch from the notch 516 of the lever 508. By reason of the tension of the spring 511, the lever 508 is thereupon rotated counterclockwise to the position shown in FIGURE 23. The pin 517 on the lever 508 pushes against the end of slot 518 in the understop slide 505 so that as soon as the lower edges of the body portions 500 and 500a of the repeat sensing plates 492 are raised sufficiently during the upstroke of the operating channels 440, the understop slide 505 will likewise move to the left so that projections 503 and 504 thereon will be in position immediately underneath the body portions 500 and 500a and therefore stop any further downward movement of the repeat sensing plates 492. This in turn prevents the lift bars 489 and the reset bars 455 from moving down during the downstroke of the operating channels 440 with the result that all the flippers 433 in the non-striking position, illustrated in FIGURE 26, will be reset to the striking position by virtue of the engagement of the upper edges of the reset bars 455 with the corners 454 of the sensor slides 430.

At the same time the movement to the left, as seen in FIGURES 23 and 24, of the end 526 of the lever 508 causes the connecting lever 523 to rotate clockwise around its pivot pin 524 under the urging of spring 477. This in turn, as described previously, urges the topstop slide 464 to the right to activate the card detectors 460.

While ordinarily there will be no movement of record cards over the sensing station while the repeat signal is in effect, it is to be understood that such cards may nevertheless be moved over the sensing station. If such cards have perforations in all of the positions for which the fingers 414 are set to be moved into the grooves 422 of the cover 415 at each upstroke, there will be no effect on the setting of the sensor. If, however, one such card does not have a perforation at a location where a finger 414 is set to penetrate the card, then the sensor slide 430 for that location will be stopped by the card during the upstroke and the flipper 433 for that sensor slide will assume the position illustrated in FIGURE 26. Thereafter, with each stroke of the sensor the foot 446 of the flipper 433, whose position relative to the sensor slide 430 has thus been altered, will avoid contact with the Bowden ends 447 and therefore not send a signal until the repeat mechanism has been inactivated.

In order to provide means for sending a signal for each stroke of the work operator regardless of whether it is in the repeat or non-repeat position and whether or not there is a card in the sensing position, the rear face plae 442, as shown best in FIGURE 18, is provided at its bottom with a bent portion 530 for engagement with a Bowden end 531.

If all cards to be sensed do not have at least one perforation in a given location, means can nevertheless be provided for counting the number of sensing strokes in a given run. This is accomplished by using a sensor slide 430 not having a finger 414 and connecting the corresponding signal dispatching means to as to actuate a counter in the counter assembly 900. Such a sensor slide, never making contact with a card, will not change the position of its associated flipper to the no-signal position. The associated flipper will, therefore, remain in the signal position shown in FIGURE 25 unless the card detector mechanism, not detecting a card at the station, causes all flippers to be moved to the no-signal position.

These and other modifications of the machine embodying the invention, as well as other variations, applications and uses of the several subcombinations of the invention described will readily be apparent to those skilled in the art upon reading the description, and are intended to be included within the scope of the invention as set forth in the claims.

We claim:

1. In a machine of the class described, sensing means comprising vertically movable sensor fingers, each finger being on the upper end of a sensor slide, an associated flipper for each sensor slide pivotally supported in signalling position by a vertically reciprocable flipper channel, each sensor slide and corresponding flipper having engaging cam faces adjacent their ends, said flipper being biased to engage its cam with the cam on its sensor slide to elevate the sensor slide therewith as a unit upon upward movement of its supporting flipper channel without change from the signalling position when there is no obstruction to movement of the sensor finger into a card path, and said cams pivoting the flipper to a non-signalling position upon continued elevation thereof relative to the sensor slide when the latter is arrested by engagement of its sensor finger with a card, a signal receiving element under the flipper in its signalling position for engagement thereby on the downstroke of the flipper channel, said signal receiving means being avoided when the flipper is pivoted to the non-signalling position, and reset bars for engaging the sensor slides to hold them at the end of a down stroke of the flipper channel for resetting actuated flippers back to signalling position in cammed engagement with associated sensor slides.

2. In a machine of the class described, sensing means comprising vertically movable sensor fingers, each finger being on the upper end of a sensor slide in cammed engagement with an associated flipper pivotally supported in signalling position by a vertically reciprocable flipper channel, said flipper being biased to elevate the sensor slide upon upward movement of its supporting flipper channel without change from the signalling position when there is no obstruction to movement of the sensor finger into a card path and with pivotal movement of the flipper to a non-signalling position upon continued elevation thereof when elevation of the sensor finger is arrested, a signal receiving element under the flipper in its signalling position for engagement thereby on the downstroke of the flipper channel, said signal receiving means being avoided when the flipper is pivoted to the non-signalling position, reset bars for resetting actuated flippers to the non-signalling position in cammed engagement with associated sensor slides, a card detector biased for movement into the card path for arresting elevation of the sensor slides when a card is not presented while the associated flippers are actuated into non-signalling position, lever means actuatable upon signal for inactivating the card detector and vertically reciprocating the reset bars with the flipper channels for non-engagement of the sensor slides for repeating a previous signal pattern without sensing a new card, latch means for locking the lever means in actuated position, said latch means being releasable upon signal for reactivating the card detector and holding the reset bars against vertical reciprocation for resetting the flippers at each stroke of the sensor, means for maintaining at least one flipper in signalling position unless actuated into a non-signalling position by the card detector, and a releasably mounted cover plate having an underside immediately above the card path for holding a card against upward movement during the sensing operation, said underside having indentations for accommodating sensor fingers in their elevated positions.

3. In a machine of the class described, means for supporting a record card at a fixed location in the machine, a sensor frame mounted below the record card for reciprocation relative to the card, a work operator for reciprocating the sensor frame, sensor fingers mounted on the sensor frame for sliding movement thereon, means for urging each sensor finger into the card path comprising a member for each sensor finger pivotally mounted on the reciprocating sensor frame for rocking movement thereon, each sensor finger and its cooperating member reciprocating with the sensor frame as a unit when the sensor finger is unobstructed by a card during an upward stroke of the reciprocating frame, interengaging means on each sensor finger and its cooperating member for rocking the member when the finger is obstructed by engagement with the card and slides relative to the reciprocating frame and member, signal dispatching means associated with the cooperating member for each sensing finger, and means for restoring each member and signal dispatching means at the end of a downward stroke of the reciprocating frame.

4. Sensing means as set forth in claim 3 wherein each sensor finger is on a sensor slide and the means comprising a member for urging the sensor finger into the card path is an associated flipper in engagement with the sensor slide and movable longitudinally toward and away from the card path.

5. Sensing means as set forth in claim 3 wherein each sensor finger is on a sensor slide and the means comprising a member for urging the sensor finger into the card path is an associated flipper in engagement with the sensor slide and movable longitudinally toward and away from the card path, and the signal dispatching means comprises a foot portion on said flipper for selective engagement with a signal-receptive element when the flipper is moved away from the card path.

6. Sensing means as set forth in claim 3 wherein each sensor finger is on a sensor slide and the member for urging the sensor finger into the card path comprises an associated flipper in engagement with the sensor slide and movable longitudinally toward and away from the card path, and the inactivating means comprises a pivotal support for the flipper and interengaging cams on the flipper and associated sensor slide for rotating the flipper into non-signalling position when movement of the sensor finger into the card path is arrested while the flipper slides over the sensor bar and continues to move toward the card path.

7. Sensing means as set forth in claim 3 wherein each sensor finger is on a sensor slide and the member for urging the sensor finger into the card path comprises an associated flipper in engagement with the sensor slide and movable longitudinally toward and away from the card path, a pivotal support for the flipper, interengaging cams on the flipper and associated sensor slide for rotating the flipper into non-signalling position when movement of the sensor finger into the card path is arrested while the flipper slides over the sensor bar and continues to move toward the card path, and bar means engaging the sensor slide for limiting its movement away from the card path while movement of the associated flipper continues to slide the flipper out of engagement with the sensor bar, thereby rotating the flipper back into signalling position for reengagement with the sensor bar upon return movement thereof toward the card path.

8. In sensing means for a machine of the class described, comprising sensor fingers movable into a card path and means, actuatable by said fingers when movement thereof into the card path is externally arrested, for inactivating signal dispatching means, the improvement which comprises a card detector biased for movement into the card path when a card is not presented for internally arresting movement of the sensor fingers into the card path and inactivating the signal dispatching means.

9. In sensing means for a machine of the class described, comprising a plurality of sensor fingers for sensing a pattern of perforations in a record card, means for translating the sensed pattern into a corresponding pattern of signals, and means for resetting the sensor fingers after actuation of said signal pattern, the improvement which comprises means operable upon signal for inactivating the resetting means for repeating actuation of the same signal pattern without sensing a new card.

10. In sensing means for a machine of the class described, comprising a plurality of sensor fingers for sensing a pattern of perforations in a record card, means for translating the sensed pattern into a corresponding pattern of signals, means for resetting the sensor fingers after actuation of said signal pattern, the improvement which comprises means operable upon signal for inactivating the resetting means for repeating actuation of the same signal pattern without sensing a new card, and means operable upon signal for reactivating the resetting means.

11. In sensing means for a machine of the class described, comprising a plurality of sensor fingers for sensing a pattern of perforations in a record card, means for translating the sensed pattern into a corresponding pattern of signals, and means for resetting the sensor fingers after actuation of said signal pattern, the improvement which comprises a card detector biased for movement into a card path for arresting movement of the sensor fingers when a card is not presented for sensing and avoiding dispatch of sensing signals, means operable upon signal for inactivating the card detector and the resetting means for repeating actuation of a previous signal pattern without sensing a new card, and means operable upon signal for reactivating the card detector and resetting means.

12. For a machine of the class described, a sensor cover adapted for support on rail members and over a card path, said cover having lip members for juxtapositioning closely adjacent and inwardly of the rail members and for resilient camming engagement with plate members spring-biased in the rail members.

References Cited by the Examiner
UNITED STATES PATENTS 2,638,270  5/1953  Jones _____ 235—61.11

ROBERT C. BAILEY, *Primary Examiner.*

MALCOLM A. MORRISON, *Examiner.*

G. D. SHAW, *Assistant Examiner.*